United States Patent [19]

Yura

[11] Patent Number: 5,644,206

[45] Date of Patent: Jul. 1, 1997

[54] CONTROL UNIT FOR INDUCTION MOTOR

[75] Inventor: Motozumi Yura, Niwa-gun, Japan

[73] Assignee: Okuma Corporation, Nagoya, Japan

[21] Appl. No.: 632,067

[22] Filed: Apr. 15, 1996

[30] Foreign Application Priority Data

Apr. 18, 1995 [JP] Japan ................. 7-092165

[51] Int. Cl.[6] ........................................ H02P 7/63
[52] U.S. Cl. ....................... 318/807; 318/800; 318/812
[58] Field of Search .................................. 318/798, 799, 318/800, 801, 807, 808, 809, 812

[56] References Cited

U.S. PATENT DOCUMENTS

| 4,672,287 | 6/1987 | Fujioka et al. | 318/800 |
|---|---|---|---|
| 4,823,066 | 4/1989 | Yoshiki et al. | 318/798 |
| 5,066,899 | 11/1991 | Nashiki | 318/807 |
| 5,341,081 | 8/1994 | Yamada | 318/800 |

FOREIGN PATENT DOCUMENTS 6489987  4/1989  Japan .
6489988  4/1989  Japan .

*Primary Examiner*—Bentsu Ro
*Attorney, Agent, or Firm*—Oliff & Berridge

[57] ABSTRACT

A control unit for an induction motor continuously provides a precise output torque without being adversely affected by a magnetic saturation of an iron core, or varying precision of sizes of components constituting the motor or varying temperature of the motor. When a torque command value $T^*$ is smaller than a predetermined value Trf, an excitation inductance M is corrected in accordance with a torque voltage command $Gq \cdot \Delta i1q$ which is calculated on the basis of a torque current command $i1q^*$ and a torque current $i1q$. Further, a secondary resistance $r2$ is corrected on the basis of the torque voltage command $G \cdot \Delta i1q$. A slip frequency is calculated on the basis of the secondary resistance $r2$, a magnetic induction command $\phi^*$, and torque current command $i1q^*$. An angular frequency command $\omega$ is calculated. The magnetic induction command $\omega^*$ and the torque command $T^*$ are converted into an excitation voltage command $ed^*$ and torque voltage command $eq^*$ to be applied to the motor on the basis of the corrected excitation inductance M and the angular frequency command $\omega$.

4 Claims, 4 Drawing Sheets

Fig. 1

PRIOR ART

CONTROL UNIT FOR INDUCTION MOTOR

BACKGROUND OF THE INVENTION

1. Field of the Invention

The present invention relates to a control unit for controlling an output torque of an induction motor which is used for driving a spindle of a machine tool.

2. Description of the Prior Art

DC motors have been popular up to now because it is easy to control their speeds and torque. However, such DC motors are disadvantageous since they have a very complicated structure because of windings provided in rotors, are rather expensive, and have to be periodically maintained due to worn brushes. Recently, a vector control system has been proposed to control an induction motor, and is effective in controlling an output vector of the induction motor as desired. This control system has enabled induction motors to be frequently adopted to operate a spindle of a machine tool in place of the DC motor. Since they have a simple and durable structure and do not require replacement of brushes, induction motors have come into wide use.

Figure 1:
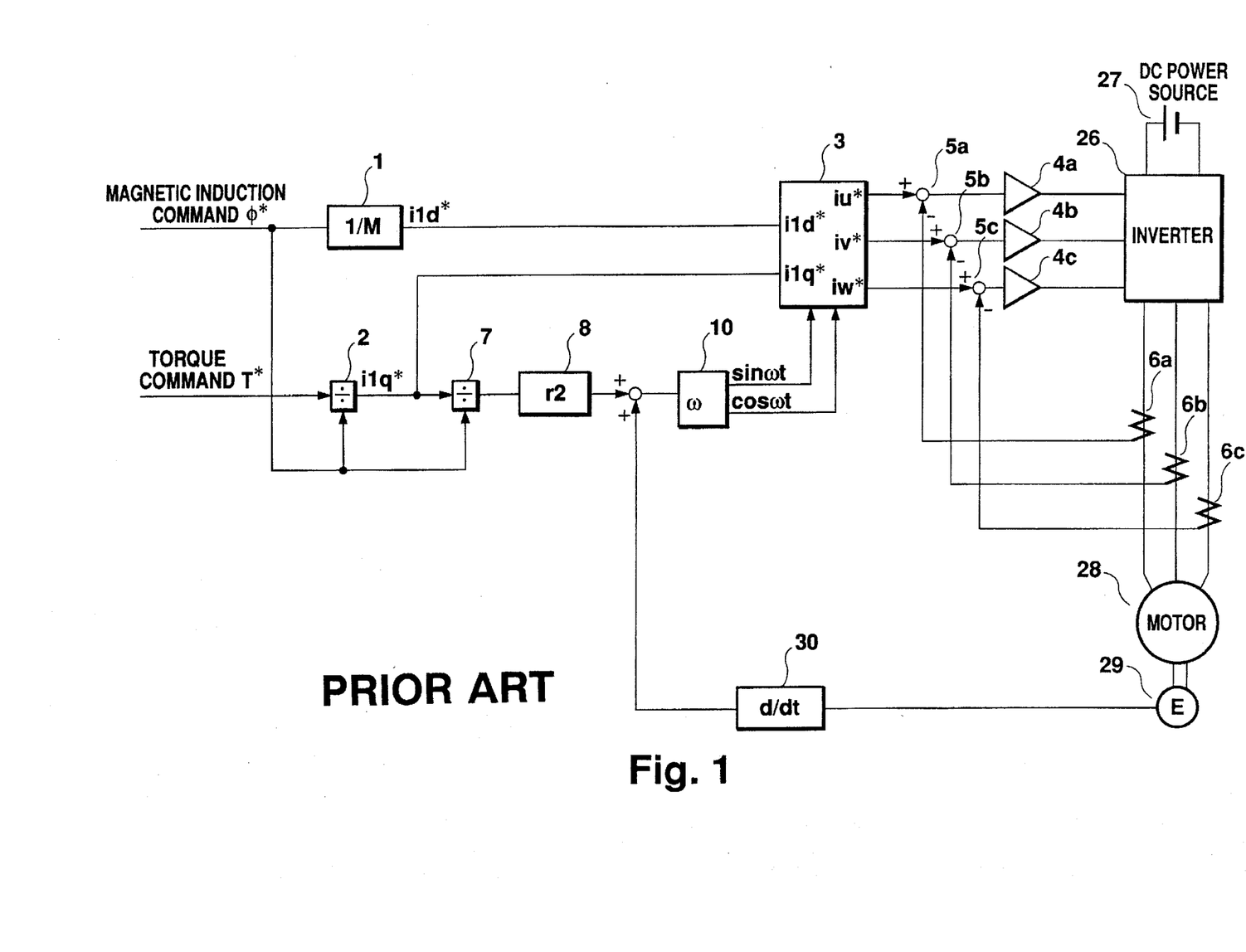
FIG. 1 is a block diagram of a conventional control unit for an induction motor.

FIG. 1 of the accompanying drawings shows the configuration of one example of a control system for the vector control of a conventional induction motor. This control system receives a torque command T* and a magnetic induction command $\phi^*$ as input commands from an outside source. The magnetic induction command $\phi^*$ is usually a predetermined constant value. However, when it is necessary to suppress a terminal voltage of the motor below a certain level in order to rotate the motor at a high speed, or when the motor should be operated with a reduced magnetic induction, the magnetic induction command $\phi^*$ is varied accordingly. Referring to FIG. 1, a converter 1 generates an excitation current command i1d* in response to the magnetic induction command $\phi^*$. As will be described later, the excitation current is proportional to the magnetic induction, and has a proportional coefficient which is an inverse of an excitation inductance M. Specifically, the converter 1 multiplies the inverse of the excitation inductance M with the magnetic induction command $\phi^*$, thereby deriving the excitation current command value i1d*. A divider 2 divides the torque command T* by the magnetic induction command $\phi^*$. An output torque of the induction motor is proportional to a product of the magnetic induction and the torque current. Thus, an output of the divider 2 is provided as a torque current command value i1q*.

This control unit operates as described hereinafter. Primary current command values iu*, iv* and iw* are expressed as follows using an angular frequency $\omega$ of a motor current, on the basis of the excitation current command value i1d* and the torque current command value i1q*. This operation is performed by a two-phase-to-3-phase converter 3 shown in FIG. 1.

$$iu^* i1d^* \cdot \sin\omega t + i1q^* \cdot \cos\omega t \qquad (1)$$

$$iv^* = i1d \cdot \sin(\omega t - 120°) + i1q^* \cdot \cos(\omega t - 120°) = \qquad (2)$$

$$(-i1d^*/2 + \sqrt{3/2} \cdot i1q^*)\sin\omega t +$$

$$(-\sqrt{3/2} \cdot i1d^* - i1q^*/2)\cos\omega t$$

$$iw^* = i1d \cdot \sin(\omega t - 120°) + i1q^* \cdot \cos(\omega t - 120°) = \qquad (3)$$

-continued $$(-i1d^*/2 + \sqrt{3/2} \cdot i1q^*)\sin\omega t +$$

$$(\sqrt{3/2} \cdot i1d^* - i1q^*/2)\cos\omega t$$

The motor current is feedback-controlled by current error amplifiers 4a, 4b and 4c, subtractors 5a, 5b and 5c, and current sensors 6a, 6b and 6c. In other words, primary currents equivalent to the primary current command values iu*, iv* and iw* are introduced into the motor. When an actual excitation current i1d and an actual phase of the torque current i1q in the motor are assumed to be equal to the foregoing excitation current command value i1d* and the phase of the torque current command value i1q*, a combined vector I1 of the primary currents is expressed as follows using i1d and i1q.

$$I1 = i1d \cdot \sin\omega t + i1q \cdot \cos\omega t \qquad (4)$$

$$I1 = (i1d^2 + i1q^2)^{1/2} \cdot \sin(\omega t + \theta 2) \qquad (5)$$

$$\theta 2 = \tan^{-1}(i1q/i1d) \qquad (6)$$

Figure 2:
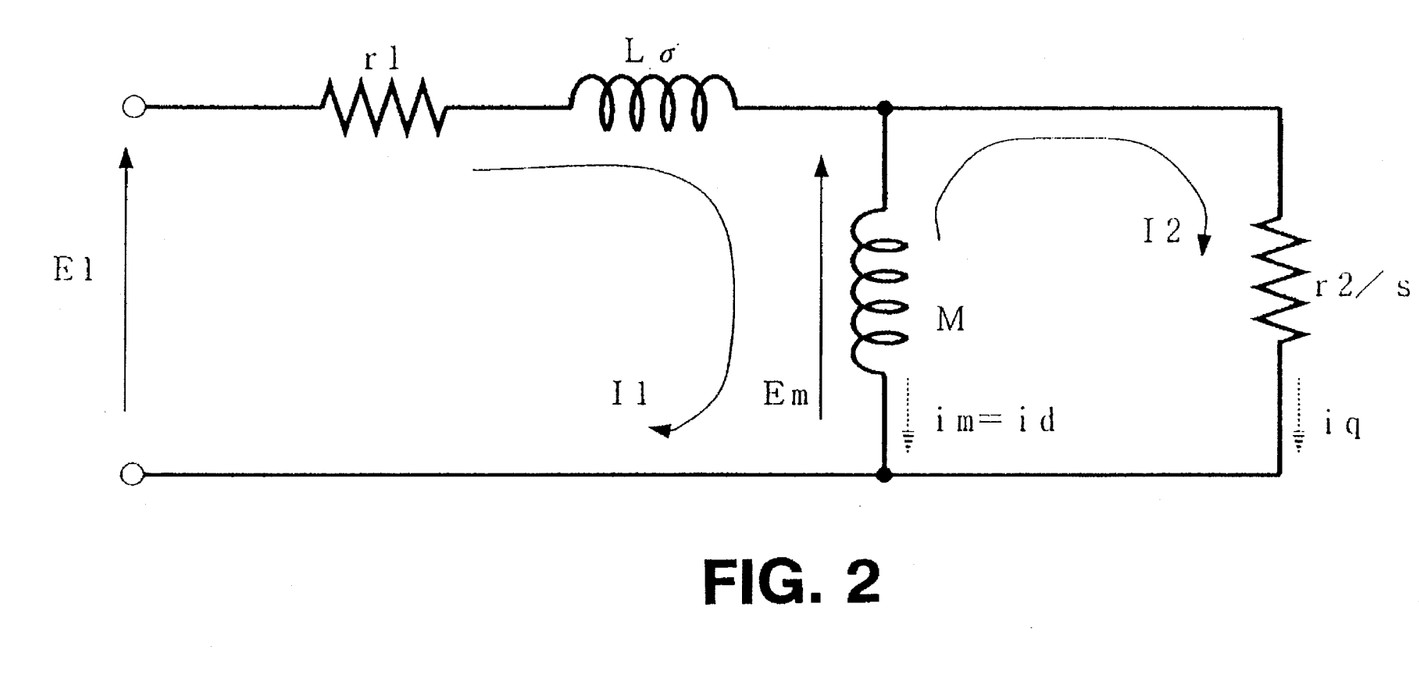
FIG. 2 shows an equalizing circuit of an induction motor.

FIG. 2 shows a general equalizing circuit in the induction motor. When the primary current I1 flows to the motor, a voltage drop occurs at opposite ends of a primary leakage inductance L$\sigma$ and a primary resistance r1. Thus, a terminal voltage E1 is generated at a motor terminal. The terminal voltage E1 is expressed by formula (7), where "p" denotes a differential operator d/dt.

$$E1 = Em + (p \cdot L\sigma + r1)I1 \qquad (7)$$

The second term of equation (7) is very small compared with the first term Em, and is negligible here, thereby deriving equation (8).

$$E1 = Em \qquad (8)$$

Em generally denotes a motion electromotive voltage, and has the following relationship with the excitation current i1d of the motor.

$$Em = \omega \cdot M \cdot i1d \cdot \cos\omega t \qquad (9)$$

Referring to the equalizing circuit in FIG. 2, the motion electromotive voltage Em and the torque current i1q have the relationship expressed by equation (10).

$$Em = r2 \cdot i1q/s \text{ (but } s = \omega s/\omega) \qquad (10)$$

In equation 10, $\omega s$ denotes a slip frequency, and is expressed by equation (11), where $\omega m$ denotes an angular frequency of the motor.

$$\omega s = \omega - \omega m \qquad (11)$$

In order to control the torque current i1q of the motor to a desired value, the slip frequency $\omega s$ satisfying equations (10) and (11) should be applied to the motor. Referring to FIG. 1, a divider 7 and a converter 8 provide the slip frequency $\omega s$ in accordance with the torque current command i1q*.

The foregoing can be paraphrased as follows. The primary current of the motor is feedback-controlled in accordance with the equations (1), (2) and (3). Then, the primary current I1 expressed by equation (4) is controlled to the desired value. At the same time, the slip frequency expressed by the equation (10) is applied to the motor, and the actual torque current i1q of the motor is controlled to the desired value, i.e. i1q*. As expressed by equation (4), the excitation current i1d can be controlled to an optional value.

Torque outputted by the motor will be now considered. An output power P of the motor can be derived by subtracting a loss caused in a secondary resistance r2 from the power applied to a secondary circuit of the motor, as can be seen in the equalizing circuit of FIG. 2. Power Pu for a certain phase is expressed by:

$$Pu = Em \cdot i1q \cdot \cos \omega t - r2/s \cdot i1q^2 \quad (12)$$

When the loss in the secondary resistance r2 is approximately negligible and the equation (9) is substituted into the equation (12), equation (13) can be derived.

$$Pu = \omega \cdot M \cdot i1d \cdot i1q (\cos \omega t)^2 \quad (13)$$

Considering two-phase powers Pv and Pw for a three-phase motor, Pv and Pw will be expressed by equations (14) and (15), respectively.

$$Pv = \omega \cdot M \cdot i1d \cdot i1q \{\cos (\omega t - 120°)\}^2 \quad (14)$$

$$Pw = \omega \cdot M \cdot i1d \cdot i1q \{\cos (\omega t - 120°)\}^2 \quad (15)$$

A final output power P is derived by summing the powers for the three phases.

$$\begin{aligned} P &= Pu + Pv + Pw \quad (16) \\ &= \omega \cdot M \cdot i1d \cdot i1q \{\cos \omega t\}^2 + \\ &\quad \{\cos(\omega - 120°)\}^2 + \\ &\quad \{\cos(\omega t + 120°)\}^2 \} \end{aligned}$$

Equation (16) can be modified to:

$$P = (3/2) \cdot \omega \cdot M \cdot i1d \cdot i1q \quad (17)$$

When $\omega$ is approximated to be substantially equal to the motor angular frequency $\omega m$, the output torque T of the motor is expressed by:

$$T = P/\omega m = (3/2) \cdot M \cdot i1d \cdot i1q \quad (18)$$

From the foregoing, when the excitation current i1d and the torque current i1q are controllable to the desired values, the torque T of the motor can be controlled optionally.

The foregoing control unit is prone to the following two problems. Fist of all, although the excitation inductance M is considered to have a certain value, respective motors have their own excitation inductance values, and different motion electromotive voltages Em. The excitation inductance M usually fluctuates with such factors as magnetic saturation of an iron core and precision of sizes of the motor during manufacture. In equation (9) for calculating the speed inducing voltage Em, the excitation inductance M is used as a coefficient. Therefore, if an actual value of the excitation inductance M differs from the value used for the calculation, the derived speed inducing inductance Em inevitably contains an error. Further, the output torque will also contain an error, which means that the motor cannot be controlled accurately.

Secondly, the secondary resistance r2 which is treated as a constant varies with temperature, so the calculated slip s is not always an optimum value. When an operating temperature of the motor is near its upper limit, the secondary resistance r2 becomes twice as large as that at a normal temperature. In equation (10), the secondary resistance r2 is treated as a coefficient. When the secondary resistance r2 varies with temperature, the calculated slip s may differ from the slip s to be actually set. Thus, the motor cannot be reliably and accurately controlled.

SUMMARY OF THE INVENTION

The present invention is aimed at overcoming the foregoing problems of the prior art, and providing a control unit for an induction motor, which can reliably control an output torque of the motor even when an excitation inductance M and a secondary resistance r2 are not accurately recognized.

There is provided a control unit for an induction motor which is actuated by a 3-phase current converted from a DC current. The control unit converts a two-phase command, including a torque command and a magnetic induction command, into a three-phase command for controlling a primary current of the induction motor, converts a primary current in an actual three-phase current of the induction motor into a two-phase current including a torque current value and an excitation current value, and performs a feedback control of the induction motor.

The magnetic induction command and the torque command are converted as described below, and are transmitted to the two-phase-to-three phase converter.

In an excitation current command issuing circuit, the magnetic induction command is multiplied by a reciprocal of an excitation inductance, and is converted into an excitation current command. The excitation current value is subtracted from the excitation current command in an excitation current error calculating circuit, thereby deriving an error of the excitation current. This error is amplified by an excitation voltage command calculating circuit, and serves as an excitation voltage command.

In a torque current command issuing circuit, the torque command is divided by the magnetic induction command, thereby being converted into a torque current command. A torque current error calculating circuit subtracts the torque current value from the torque current command, thereby deriving a torque current error. The torque current error is amplified by a torque voltage command calculating circuit, thereby obtaining a torque voltage command.

The excitation voltage command and the torque voltage command are corrected as described below on the basis of an angular frequency command and a primary leakage inductance. The angular frequency command will be described later. The corrected excitation voltage command eid* is derived by subtracting a product (of the torque current command, the primary leakage inductance and the angular frequency command) from the excitation voltage command, i.e. eid*=(excitation voltage command)−$\omega \cdot L\sigma \cdot i1q^*$.

The corrected torque voltage command e1q* is derived by adding a product (of the excitation current command, the primary leakage inductance and the angular frequency, and a product of the magnetic inductance command), an induction voltage constant and the angular frequency, and a product (of torque current command and a primary resistance) to the torque voltage command, i.e. e1q*=(torque voltage command)+$\omega \cdot L\sigma \cdot i1d^*$+Kem·$\phi^*$·$\omega$+r1·i1q*.

Both the corrected excitation voltage command and the corrected torque voltage command are transmitted to the two-phase-to-three-phase converter.

The angular frequency command is calculated as follows.

A slip angular frequency calculating circuit divides the torque current command by the magnetic induction command, multiplies the quotient by a secondary resistance of the motor, and derives a slip angular frequency. An angular frequency command calculating circuit adds the slip angular frequency and an actual angular frequency of the motor, thereby obtaining an angular frequency command.

The secondary resistance of the motor is corrected as described below.

A secondary resistance correcting value calculating circuit multiplies the torque voltage command by a predetermined coefficient, thereby deriving a secondary resistance correcting value. Then, the secondary resistance used by the slip angular frequency calculating circuit will be corrected using the correcting value.

The excitation inductance will be corrected as follows. An excitation inductance correcting value calculating circuit calculates an excitation inductance correcting value on the basis of the product of the torque voltage command and a predetermined coefficient and the magnetic inductance command. Thus, the excitation inductance will be corrected using the correcting value in the excitation current command issuing circuit.

According to a second aspect of the invention, there is provided a control unit for an induction motor to which a torque command and a magnetic induction command are input. The control unit comprises: a two-phase sine wave generating circuit for generating a sin ωt signal and a cos ωt signal using a motor current angular frequency ω as an input; a 3-phase-to-2-phase converting circuit for outputting an excitation current value and a torque current value using the sin ωt and cos ωt signals and instantaneous values iu, iv and iw of a motor current as inputs; a 2-phase-to-3-phase converting circuit for outputting phase voltage commands eu, ev and ew using an excitation current/voltage command, a torque current/voltage command, the sin ωt signal and the cos ωt signal as inputs; an excitation current command issuing circuit for issuing an excitation current command by dividing the magnetic induction command by a coefficient equivalent to an excitation inductance M; a first subtracting circuit for outputting an excitation current error by subtracting the excitation current value from the excitation current command; a first amplifying circuit for outputting an excitation current voltage command to the induction motor using the excitation current error as an input; a second subtracting circuit for outputting a torque current error by subtracting the torque current value from a torque current command which is obtained by dividing the torque command by the magnetic induction command; a second amplifying circuit for outputting the torque current/voltage command for use with the motor using the torque current error as an input; a third amplifying circuit for outputting a slip angle frequency by dividing the torque current command by the magnetic induction command and by multiplying a quotient with a coefficient equivalent to a secondary resistance value r2 of the induction motor; a fourth amplifying circuit for outputting a corrected coefficient equivalent to the secondary resistance value r2 of the induction motor using the output of the second amplifying circuit as an input; a fifth amplifying circuit for outputting a corrected value of the excitation inductance M using the output of the second amplifying circuit as an input only when the torque command value is smaller than a predetermined value; and a holding circuit for holding the output value of the fifth amplifying circuit when the torque command value is larger than the predetermined value. The third amplifying circuit corrects the corrected coefficient equivalent to the secondary resistance r2 of the induction motor using the output value of the fourth amplifying circuit as an input, and the first amplifying circuit corrects the corrected value of the coefficient equivalent to the excitation inductance M using the output of the fifth amplifying circuit as an input.

In the control unit, the 3-phase-to-2-phase converting circuit detects the excitation current i1d and torque current i1q as DC quantities of the motor on the basis of instantaneous values iu, iv and iw of the motor current. Feedback control is applied to the excitation current command i1d* (converted magnetic induction command) and the torque current command i1q* (converted torque command). The torque voltage command, derived by amplifying the difference between the torque current command i1q* and the torque current i1q, is equivalent to the motion electromotive voltage when the torque command is minute. Thus, an actual value of the excitation inductance M can be identified using the torque current and voltage commands. Further, when the excitation inductance M has been identified, variations of the torque current and voltage commands with respect to the torque current command represent whether or not the slip frequency is appropriate. Therefore, it is possible to identify a variation of the secondary resistance r2. With respect to the excitation inductance M and the secondary resistance r2, control parameters used by the control unit can be always and precisely made to agree with an actual value of the motor.

The invention will become more apparent from the following detailed description of a presently preferred embodiment when taken in conjunction with the accompanying drawings.

BRIEF DESCRIPTION OF THE DRAWINGS

Identical parts are designated by identical reference numerals throughout the drawing figures.

DESCRIPTION OF THE PREFERRED EMBODIMENT

Figure 3:
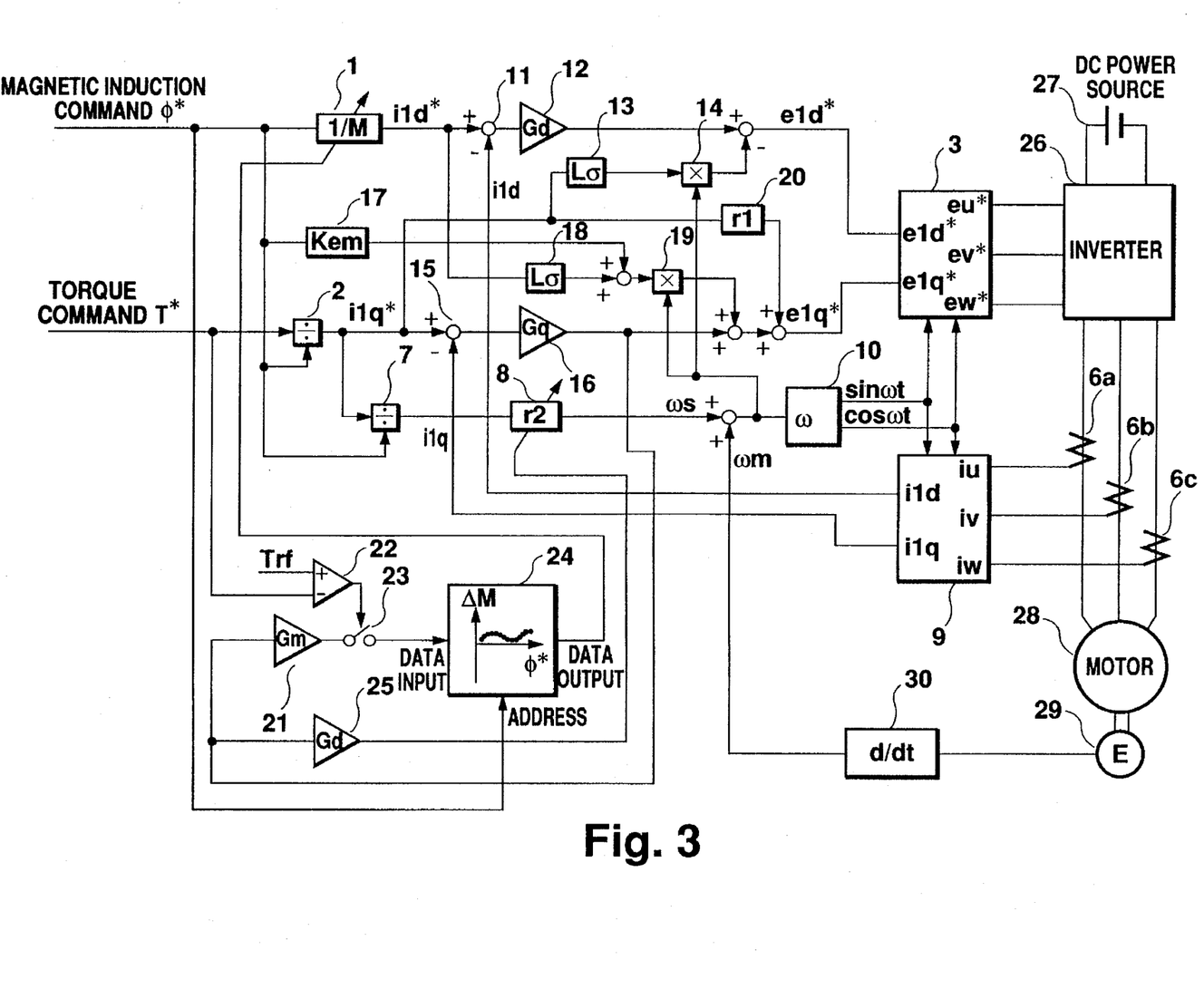
FIG. 3 is a block of a control unit for an induction motor, according to a preferred embodiment of the invention.

In a preferred embodiment of the invention, a control unit for an induction motor is configured as shown in FIG. 3 The parts identical to those shown in FIG. 1 will not be repeatedly described here.

A 3-phase-to-2-phase converter 9 calculates a detected excitation current value i1d and a detected torque current value i1q using the following equation on the basis of instantaneous values iu, iv and iw of a motor current, and a sin ωt signal and a cos ωt signal outputted by a 2-phase sine wave generator 10.

$$i1d = iu \cdot \sin\omega t + iv \cdot \sin(\omega t + 120°) + iw \cdot \sin(\omega t + 120°) \quad (19)$$

$$i1q = iu \cdot \cos\omega t + iv \cdot \sin(\omega t + 120°) + iw \cdot \cos(\omega t + 120°) \quad (20)$$

Equations (19) and (20) will be described hereinafter. The sin ωt and cos ωt signals are used to project a 3-phase motor current onto a biaxial coordinate using a phase of the sin ωt signal as a phase reference signal. This transformation is generally called "dq axis transformation". The relationship between the voltage and the current of the motor will be described using the calculated excitation current i1d and torque current i1q.

FIG. 2 shows an equalizing circuit. In FIG. 2, E1, I1 and I2 represent a voltage of a primary terminal, a current of a primary winding, and a current of a secondary winding, all of which are AC quantities. The foregoing currents and voltage are expressed as follows using the excitation current i1d and the torque current i1q calculated by the equations (19) and (20).

$$I1 = i1d \cdot \sin \omega t + i1q \cdot \cos \omega t \quad (21)$$

$$I2 = i2d \cdot \sin \omega t + i2q \cdot \cos \omega t \quad (22)$$

$$E1 = e1d \cdot \sin \omega t + e1q \cdot \cos \omega t \quad (23)$$

Since "$\omega$" is an angular frequency of a power source voltage, the excitation current i1d, torque current i11, secondary excitation current i2d, primary torque current i2q, excitation voltage e1d and torque current e1q are DC quantities, i.e. scalar quantities. The axes of coordinates which are orthogonal to each other are called the "d-axis" and "q-axis", respectively.

The voltage and currents in the equalizing circuit (FIG. 2) can be expressed by equations (24) and (25) using the foregoing i1d to e1q. In these equations, "p" is a differential operator (d/dt).

$$e1d = r1 \cdot i1d + p(L\sigma + M)i1d - \omega(L\sigma + M)i1q - \quad (24)$$
$$p \cdot M \cdot i2d + \omega \cdot M \cdot i2q$$

$$e1q = \omega(L\sigma + M)i1d + r1 \cdot i1q + p(L\sigma + M)i1q - \quad (25)$$
$$\omega \cdot M \cdot i2d + p \cdot M \cdot i2q$$

These equations represent the relationship between the primary voltage and the primary current (i.e. a current in a stator), and the secondary current (i.e. a current in a rotor). In this state, the primary voltages e1d and e1q are affected by both the primary and secondary currents, which means that neither the primary nor second currents can be controlled simply using the primary voltage as a quantity to be treated.

Figure 4:
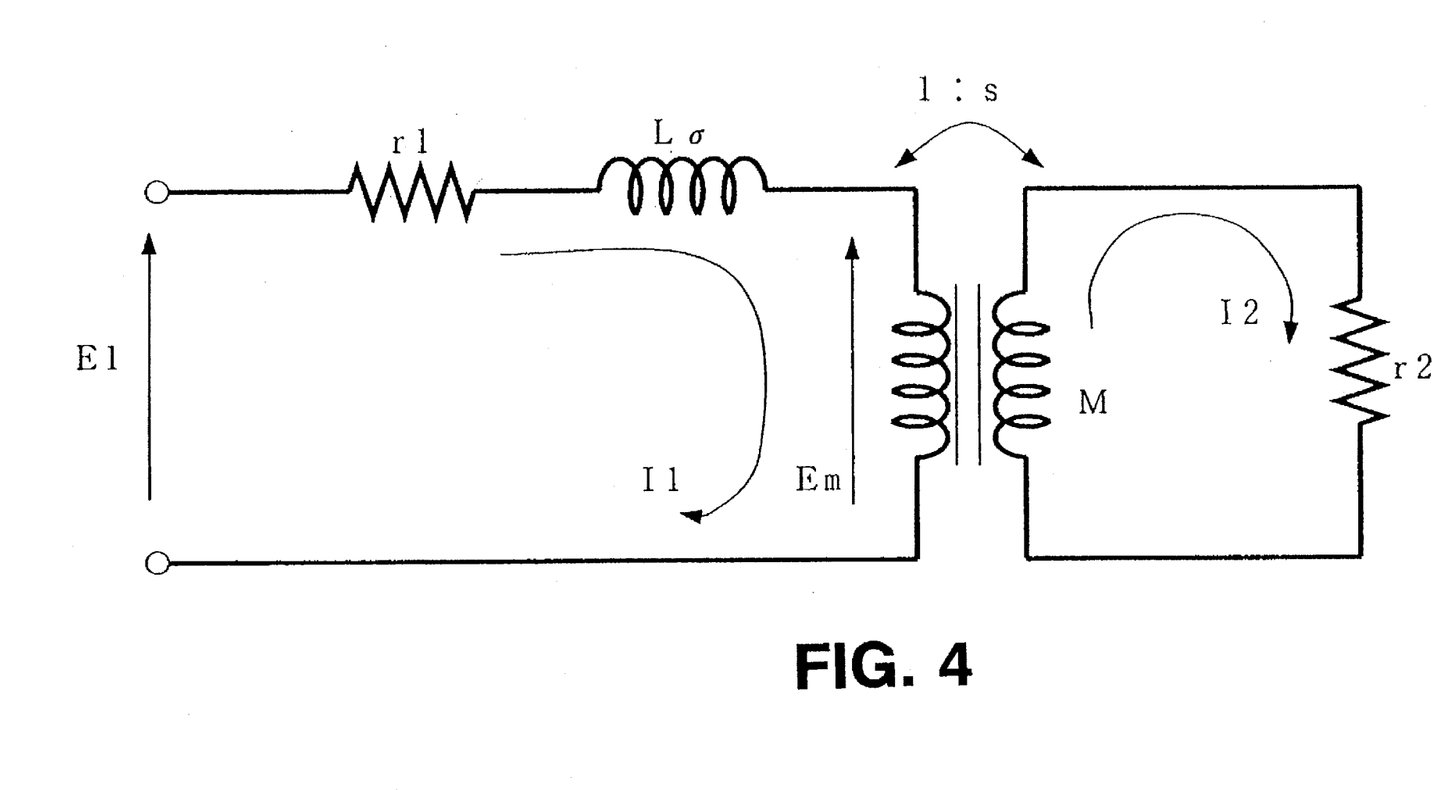
FIG. 4 shows an equalizing circuit of an induction motor.

A secondary circuit will be considered here. The equalizing circuit of FIG. 2 is not appropriate when considering the voltage and current of the secondary circuit, so that an equalizing circuit is preferably configured as shown in FIG. 4. The induction motor can be considered as being a transformer which transmits only a motion electromotive power with a ratio of 1:s when the rotor rotates with a slip frequency $\omega s$ (=s·$\omega$) with respect to the angular frequency $\omega$ of the primary voltage. Thus, a voltage equation of the secondary circuit is expressed:

$$r2 \cdot i2d + p \cdot M \cdot i2d + s \cdot \omega \cdot M(i1q - i2q) - p \cdot M \cdot i1d = 0 \quad (26)$$

$$r2 \cdot i2q + p \cdot M \cdot i2q - s \cdot \omega \cdot M(i1d - i2d) - p \cdot M \cdot i1q = 0 \quad (27)$$

Assuming that a direction of magnetic flux vector $\Phi$ in the motor is in agreement with a direction of the d-axis, the magnetic flux vector $\Phi$ can be expressed by:

$$\Phi = \phi \cdot \sin \omega t \text{ (where } \Phi \text{ is scalar quantity)} \quad (28)$$

where $\phi$ is a scalar quantity.

$$\phi = M \cdot i1d - M \cdot i2d \quad (29)$$

In the equalizing circuit of FIG. 2, the excitation current im flowing in the excitation inductance M is expressed by equation (30). Since the q-axis component of the current is irrelevant to the excitation current im, the q-axis component is expressed by equation (31).

$$im = i1d - i2d \quad (30)$$

$$i1d = i2q \quad (31)$$

Equations (30) and (31) are substituted into equation (26), thereby deriving equation (32).

$$r2 \cdot i1d = (r2 + p \cdot M)im \quad (32)$$

Response of the excitation current im to the excitation current i1d is expressed by equation (33) on the basis of equation (32).

$$im/i1d = r2 \cdot /(r2 + p \cdot M) = 1/(1 + p \cdot M/r2) \quad (33)$$

The excitation current im responds to the excitation current i1d with first order lag, and has a time constant M/r2. In a typical induction motor, such a time constant M/r2 is several hundred milliseconds. It is not inconvenient for the excitation current im to be assumed to be constant, since the excitation current i1d varies with a sufficiently quick time constant. Further, provided that the excitation current i1d is constant, the excitation currents im and i1d are recognized as being equal.

By substituting equations (30) and (31) into equation (27), equation (34) is derived. Equation (34) may be modified to equation (35).

$$r2 \cdot i1q = s \cdot \omega \cdot M \cdot im \quad (34)$$

$$\omega s = r2 \cdot i1q/(M \cdot im) \quad (35)$$

When the excitation current im is assumed to be constant with respect to the variation of the torque current i1q, the torque current i1q, i.e. secondary torque current i2q, can be controlled as desired by applying the slip frequency $\omega s$ to the induction motor in such a manner as to satisfy equation (35).

The primary circuit will be reconsidered taking the result of the secondary circuit into consideration. Substituting equations (30) and (31) into equation (24), equation (36) will be obtained.

$$e1d = (r1 + p \cdot L\sigma)i1d - \omega \cdot L\sigma \cdot i1q + p \cdot M \cdot im \quad (36)$$

The third term is negligible since the variation of the excitation current im is sufficiently moderate as expressed in equation (33). Thus, equation (37) is derived.

$$e1d = (r1 + p \cdot L\sigma)i1d - \omega \cdot L\sigma i1q \quad (37)$$

In order to equalize the excitation current i1d with the command value i1d*, it is conceivable to design a control system which outputs the d-axis voltage command e1d* as expressed by equation (38) on the basis of a difference $\Delta i1d = (i1d^* - i1d)$ between the command value i1d* and the excitation current i1d.

$$e1d^* = Gd \cdot \Delta i1d - \omega \cdot L\sigma \cdot i1q^* \quad (38)$$

where Gd denotes an amplification factor provided by a proportional integral amplifier and is sufficiently large. Further, since the torque current i1q and the excitation current i1d are separately controlled, the second term is fed forward and added as an interference term by the q-axis. In the embodiment shown in FIG. 3, $\Delta i1d$ (=i1d*-i1d) is derived by the subtractor 11 on the basis of equation (38), thereby obtaining the first term of equation (38). The converter 13 multiplies the torque current command value i1q* with Lσ, and the multiplier 14 multiplies ω with Lσ·i1q*, thereby deriving the second term.

Equations (30) and (31) are substituted into equation (25) so as to derive equation (39).

$$e1q = \omega \cdot L\sigma \cdot i1d + (r1 + p \cdot L\sigma)i1q + \omega \cdot M \cdot im \quad (39)$$

When considering a control system for equalizing the torque current i1q with the command value i1q* similarly to the foregoing, the control system may be expressed by equation (40) on the basis of equation (39). In equation (40), Gq is sufficiently large. Further, the excitation current im is replaced with the excitation current command value i1d* on condition that the excitation current command value i1d, is constant.

$$e1q^* = Gq \cdot \Delta i1q + \omega(L\sigma + M)i1d^* + r1 \cdot i1q^* \quad (40)$$

In the embodiment of FIG. 1, the subtractor 15 derives Δi1q (=i1q*−i1q). The amplifier 16 performs amplification using the amplification factor Gq, thereby deriving the first term of equation (40). ω·M·i1d* in the second term denotes the motion electromotive voltage Em. M·i1d* denotes the magnetic induction command φ*. Thus, the converter 17 multiplies the magnetic induction command φ* by a motion electromotive voltage constant Kem. The converter 18 multiplies i1d* by Lσ. The outputs of the converters 17 and 18 are added. The multiplier 19 multiplies the sum by ω, thereby deriving the second term. The third term is derived by multiplying the torque current command i1q* by the primary resistance r1 in the converter 20.

The primary currents i1d and i1q of the induction motor can be independently and optionally controlled using equations (38) and (40).

The foregoing equations (38) and (40) are used to describe that the primary currents i1d and i1q are optionally controllable by handling the primary voltage. For this purpose, it is a prerequisite that the conditions of the secondary circuit expressed by equations (30) and (31) should be satisfied. Further, the requirement for the slip frequency ωs in equation (35) should be also satisfied. However, the secondary resistance r2 and excitation inductance M in equation (35) are not always constant because of temperature variations in the rotor and magnetic saturation of the iron core. Therefore, it is difficult to provide the motor with the slip frequency ωs which satisfies equation (35) with respect to the desired excitation current i1d, thereby preventing accurate control of the actual excitation current i1d and the actual torque current i1q. The following describe how to identify the constants M and r2 with true values denoting actual states of the motor.

It is assumed that a certain error ΔM (=Mn−M) is present between a nominal value Mn assumed at the controller with respect to the excitation inductance value and a true value M in the motor. In this state, a q-axis voltage actually generated in the motor is expressed by equation (39). A voltage outputted by the controller is expressed by equation (41).

$$e1q^* = Gq\Delta i1q + \omega \cdot L\sigma \cdot i1d^* + r1 \cdot i1q^* + \omega \cdot Mn \cdot im^* \quad (41)$$

Equations (39) and (41) can be modified as follows provided that the motor is free from load and i1q≠i1q*≠0.

$$e1q = \omega \cdot L\sigma \cdot i1d + \omega \cdot Mn \cdot im \quad (42)$$

$$e1q^* = Gq \cdot \Delta i1q + \omega \cdot L\sigma \cdot i1d^* + \omega \cdot Mn \cdot im^* \quad (43)$$

The excitation current command i1d* and the excitation current i1d are precisely controlled on the basis of these equations. Further, the excitation current im varies very moderately as expressed by equation (33). Thus, i1d* is equal to i1d, and im* is equal to im.

$$i1d^* = i1d \quad (44)$$

$$im^* = im \quad (45)$$

A difference between the equations (42) and (43) is expressed by equation (46) under the condition of equations (44) and (45). Equation (46) is modified to equation (47).

$$e1q - e1q^* = \omega(M-Mn)im - Gq \cdot \Delta i1q = 0 \quad (46)$$

$$Gq \cdot \Delta i1q = \omega(M-Mn)im = \omega \cdot \Delta M \cdot im \quad (47)$$

From equation (47), when i1q*≠0, Gq·Δi1q denotes the predetermined difference of the excitation inductance M. Therefore, it is possible to correct the nominal value Mn assumed at the controller side to the true value using Gq·Δi1q. Referring to FIG. 3, the output of the amplifier 16, i.e. Gq·Δi1q, is amplified by the amplifier 21. An output of the amplifier 21 is inputted in the data table 24 via the switch 23 only when the comparator 22 recognizes that the torque command T* is smaller than the predetermined Trf. The data table 24 shows the relationship between the integrated value of the output of the amplifier 21 and the magnetic induction command φ*. The integrated value is the error ΔM of the excitation inductance M. Even when the torque command is not 0, the coefficient 1/M of the converter 1 is continuously compensated by reading the error ΔM stored in accordance with the excitation induction command φ*. Thus, it is always possible to correct the excitation inductance M to the true value. The amplification factor Gm of the amplifier 21 is a given gain. The larger the amplification factor, the shorter the identification time of the excitation inductance M.

With respect to the secondary resistance r2, it is assumed that there is an error Δr2 between the nominal value r2n (assumed at the controller side) and an actual value r2. First of all, equation (35) is modified to equation (48).

$$\omega \cdot M \cdot im = (\omega/\omega s)r2 \cdot i1q \quad (48)$$

The q-axis voltage actually generated in the motor is expressed by equation (49) by substituting equation (39) into equation (48).

$$e1q = \omega \cdot L\sigma \cdot i1d + (r1 + p \cdot L\sigma)i1q + (\omega/\omega s)r2 \cdot i1q \quad (49)$$

The voltage e1q* outputted by the controller is expressed by equation (50) on the basis of equations (40) and (48).

$$e1q^* = Gq \cdot \Delta i1q + \omega \cdot L\sigma \cdot i1d^* + r1 \cdot i1q^* + (\omega/\omega s)r2n \cdot i1q^* \quad (50)$$

The excitation current i1d and the excitation current command value i1q* are considered to be equal to each other, as expressed by equation (44). Further, the torque current i1q and the torque current command i1q* are also assumed to be equal to each other, as expressed by equation (51) below.

$$i1q^* = i1q \quad (51)$$

Under the foregoing assumption, equation (52) is derived to express a difference between equations (49) and (50).

$$e1q - e1q^* = p \cdot L\sigma \cdot i1q - Gq \cdot \Delta i1q + (\omega/\omega s) \cdot (r2 - r2n) \cdot i1q = 0 \quad (52)$$

The first term is relatively small and negligible, thereby deriving equation (53).

$$Gq \cdot \Delta i1q = \Delta r2(\omega/\omega s)i1q \quad (53)$$

As in equation (53), $Gq \cdot \Delta i1q$ denotes the error $\Delta r2$ of the secondary resistance r2. The error $\Delta r2$ is corrected using $Gq \cdot \Delta i1q$. In the embodiment shown in FIG. 3, the amplifier 25 multiplies the output of the amplifier 16, i.e. $Gq \cdot \Delta i1q$ by the identified gain Gr, so the coefficient r2 of the converter 8 is corrected in accordance with the output of the amplifier 16.

The control system constituted on the basis of equations (38) and (40) can identify the excitation inductance M and the secondary resistance r2 with the true value on the basis of equations (47) and (53). The slip frequency ωs satisfying equation (35) based on the identified true value can be applied to the motor. Thus, the actual primary currents i1d and i1q of the motor can be controlled to the primary current command values i1d* and i1q*.

As described above, the feedback control is independently performed for the excitation current i1d, the torque current i1q with respect to the excitation current command i1d* and the torque current command i1q*. The control parameters such as the excitation inductance M and secondary resistance r2 are identified with the true values of the actual motor, so they accord with the characteristics. Thus, the motor can continuously and precisely provide the desired output without being adversely affected by variations of the excitation inductance M and secondary resistance r2, which are caused by magnetic saturation in the iron core or precise sizes of the motor or temperature variations of the motor. Thus, it is not necessary to adjust the control parameters in accordance with motors to be applied.

What is claimed is:

1. A control unit for an induction motor which is actuated by a 3-phase current converted from a DC current, the control unit converting a two-phase command, including a torque command and a magnetic induction command, into a three-phase command for controlling a primary current of the induction motor, and converting a primary current of an actual three-phase current of the induction motor to a two-phase current including a torque current value and an excitation current value, and performing feedback control of the induction motor, the control unit comprising:

(a) an excitation current command issuing circuit for calculating an excitation current command on the basis of the magnetic induction command and an excitation inductance;

(b) an excitation current error calculating circuit for calculating an error of the excitation current on the basis of the excitation current command and the excitation current value;

(c) an excitation voltage command calculating circuit for calculating, on the basis of the excitation current error, an excitation voltage command having the same phase as the phase of the excitation current;

(d) a torque current command issuing circuit for calculating a torque current command on the basis of the torque command and the magnetic induction command;

(e) a torque current error calculating circuit for calculating a torque current error on the basis of the torque current command and the torque current value;

(f) a torque voltage command calculating circuit for calculating a torque voltage command, on the basis of the torque current error, having the same phase as the phase of the torque current;

(g) a secondary resistance correcting value calculating circuit for calculating a value for correcting a secondary resistance on the basis of the torque voltage command;

(h) a slip angular frequency calculating circuit for calculating a slip angle on the basis of the torque current command, the magnetic induction command and the secondary resistance corrected by the secondary resistance correcting value;

(i) an angular frequency command calculating circuit for calculating an angular frequency command on the basis of the slip angular frequency and an actual slip angle of the induction motor;

(j) a corrected excitation voltage command calculating circuit for correcting the excitation voltage command on the basis of the torque current command, a primary leakage inductance and the angular frequency command, and calculating a corrected excitation voltage command;

(k) a corrected torque voltage command calculating circuit for correcting the torque voltage command on the basis of the excitation current command, the primary leakage inductance and the angular frequency command, further correcting the torque voltage command on the basis of the torque current command and a primary resistance of the induction motor, and calculating a corrected torque voltage command;

(l) an excitation inductance value correcting circuit for calculating a value for correcting the excitation inductance on the basis of the torque voltage command, and calculating an excitation inductance correcting value for use with the excitation current command issuing circuit on the basis of the correct excitation inductance; and (m) a three-phase voltage command calculating circuit for calculating a three-phase voltage command applicable to the motor on the basis of the corrected excitation voltage command, the corrected torque voltage command and the angular frequency command.

2. The control unit according to claim 1, wherein the exciting inductance value correcting circuit calculates the excitation inductance correcting value and issues a correcting command only when the torque command is smaller than a predetermined threshold value.

3. A control unit for an induction motor to which a torque command and a magnetic induction command are input, the control unit comprising:

(a) a two-phase sine wave generating circuit for generating a sin ωt signal and a cos ωt signal using a motor current angular frequency ω as an input;

(b) a 3-phase-to-2-phase converting circuit for outputting an excitation current value and a torque current value using the sin ωt and cos ωt signals and instantaneous values iu, iv and iw of a motor current as inputs;

(c) a 2-phase-to-3-phase converting circuit for outputting phase voltage commands eu, ev and ew applied to the motor, using an excitation voltage command, a torque voltage command, the sin ωt signal and the cos ωt signal as inputs;

(d) an excitation current command issuing circuit for issuing an excitation current command by dividing the magnetic induction command by a coefficient equivalent to an excitation inductance M;

(e) a first subtracting circuit for outputting an excitation current error by subtracting the excitation current value from the excitation current command;

(f) a first amplifying circuit for outputting the excitation voltage command for use with the motor using the excitation current error as an input;

(g) a second subtracting circuit for outputting a torque current error by subtracting the torque current value from a torque current command which is obtained by dividing the torque command by the magnetic induction command;

(h) a second amplifying circuit for outputting the torque current/voltage command for use with the motor using the torque current error as an input;

(i) a third amplifying circuit for outputting a slip angular frequency by dividing the torque current command by the magnetic induction command and by multiplying a quotient by a coefficient equivalent to a secondary resistance value $r_2$ of the induction motor;

(j) a fourth amplifying circuit for outputting a corrected coefficient equivalent to the secondary resistance value $r_2$ of the induction motor using the output of the second amplifying circuit as an input;

(k) a fifth amplifying circuit for outputting a corrected value of the excitation inductance M using the output of the second amplifying circuit as an input only when the torque command value is smaller than a predetermined value; and (l) a holding circuit for holding the output value of the fifth amplifying circuit when the torque command value is larger than the predetermined value;

wherein the third amplifying circuit corrects the corrected coefficient equivalent to the secondary resistance value $r_2$ of the induction motor using the output value of the fourth amplifying circuit as an input, and the first amplifying circuit corrects the corrected value of the coefficient equivalent to the excitation inductance M using the output of the fifth amplifying circuit as an input.

4. The control unit according to claim 3, wherein the holding circuit has a data table storing the correspondence between integrated values of signals from the fifth amplifying circuit and values of the magnetic induction command, and retrieves and outputs a correcting value in accordance with a signal from the fifth amplying circuit.

* * * * *